United States Patent [19]

Ikegami

[11] 4,424,464
[45] Jan. 3, 1984

[54] COMBINATION DC/AC GENERATOR FOR AUTOMOTIVE VEHICLES

[75] Inventor: Takashi Ikegami, Himeji, Japan

[73] Assignee: Mitsubishi Denki Kabushiki Kaisha, Himeji, Japan

[21] Appl. No.: 375,127

[22] PCT Filed: Aug. 19, 1981

[86] PCT No.: PCT/JP81/00180

§ 371 Date: Apr. 14, 1982

§ 102(e) Date: Apr. 14, 1982

[87] PCT Pub. No.: WO82/00737

PCT Pub. Date: Mar. 4, 1982

[30] Foreign Application Priority Data

Aug. 19, 1980 [JP] Japan .................. 55-117973

[51] Int. Cl.³ .................................... H02K 23/50
[52] U.S. Cl. ................... 310/68 D; 307/16; 310/131
[58] Field of Search ............ 307/16, 84; 310/59, 310/131, 112, 102 R, 68 D, 114, 184, 198; 322/90; 290/46; 318/140

[56] References Cited

U.S. PATENT DOCUMENTS

| 1,958,650 | 5/1934 | Walton ................. | 171/123 |
| 2,939,975 | 6/1960 | Richards ............... | 310/131 |
| 3,267,353 | 8/1966 | Franklin ............... | 322/90 |
| 3,577,002 | 5/1971 | Hall et al. ............ | 290/46 |
| 4,162,419 | 7/1979 | DeAngelis ............. | 310/266 |

FOREIGN PATENT DOCUMENTS

| 49-1724 | 1/1974 | Japan .................. | 310/68 D |
| 55-37585 | 3/1980 | Japan .................. | 310/68 D |

Primary Examiner—J. D. Miller
Assistant Examiner—D. L. Rebsch
Attorney, Agent, or Firm—Sughrue, Mion, Zinn, Macpeak & Seas

[57] ABSTRACT

An AC/DC generator small in size and small in weight is obtained by forming into one unit an ordinary charging generator and an inductor type generator which are juxtaposed in the axial direction. The AC section has no commutator; it can supply power for lamps or heating elements in a vehicle.

1 Claim, 4 Drawing Figures

COMBINATION DC/AC GENERATOR FOR AUTOMOTIVE VEHICLES

DESCRIPTION

1. Technical Field

This invention relates to a charging generator which is obtained by adding an AC power supplying function to a conventional charging generator which is adapted to supply a DC power to a battery on a vehicle or to a plurality of electrical equipments.

2. Background Art

FIG. 1 is a sectional view of an ordinary charging generator. In FIG. 1, reference numeral 1 designates a rotor which comprises confronted magnetic poles 2, namely, N and S poles arranged alternately and circumferentially, a field winding 3A for magnetizing the confronted magnetic poles 2, and a field core 4 which is arranged inside of the field winding 3A and on which the field winding 3A is wound. A rotary shaft 5 on which the rotor 1 is fixedly mounted is supported by bearings 6 and 7 at both ends. A pair of slip rings 8 are fixed to the rotary shaft 5 and are connected to the field winding 3A. A pair of brushes 9 are slidably in contact with the pair of brushes 8; 10, a brush holder for holds the slip rings 9; stator 11 comprises an armature core 11a which is confronted through a small gap with the confronted magnetic poles 2, and an armature winding 11b which is wound on the armature core 11a in three-phase and star connection. A rectifier device 12 subjects an AC output generated in the armature winding 11b to full-wave rectification; fan 13 together with a pulley 15 is fixedly secured to the rotary shaft 5 with a nut 14; front bracket 16 supports the above-described bearing 6 and one end portion of the above-described stator 11; rear bracket 17 holds the above-described bearing 7, the other end portion of the stator 11, the brush holder 10 and the rectifier device 12 are mounted; voltage regulator 18, accommodated in a box 10a, is integral with the brush holder 10 and is provided on the back of the brush holder 10; DC output terminal 19 is connected to the rectifier device 12.

When the charging generator 20 thus constructed is installed on a vehicle, the electrical wiring is as shown in FIG. 2. In FIG. 2, an auxiliary rectifier device 21 supplies an exciting current to the field winding 3; 22 is an exciting terminal through which an initial exciting current flows; 23 is a charging indication lamp; 24, an initial exciting resistor connected in parallel to the charging indication lamp 23; 25, a key switch; 26, a battery; and 27, a DC load such as a DC motor or a lamp.

The operation of the charging generator thus arranged will be described.

When the key switch 25 is closed, an exciting current is supplied from the battery 26 through the charging indication lamp 23 and the initial exciting resistor 24 to the field winding 3A. In this operation, the charging indication lamp 23 is turned on to indicate a non-charging state, i.e., the fact that the exciting current is being supplied to the field winding 3A from the battery 26. On the other hand, when the engine of the vehicle (not shown) is started, the rotor 1 is driven through the pulley 15 by the belt. Therefore, a rotating magnetic field is developed, and a predetermined AC output is developed in the armature winding 11b. The AC output is converted into a DC output by being subjected to full-wave rectification in the rectifier device 12. When the speed of the engine is increased to raise the voltage at the initial exciting terminal 22 to the voltage of the battery 26, no current flows in the charging indication lamp 23 and the initial exciting resistor 24. Thus, the charging indication lamp 23 indicates the fact that the charging generator 20 has been excited. Thereafter, the exciting current is supplied through the auxiliary rectifier device 21 from the armature winding 11b. When the speed of the engine is further increased, the DC output is supplied through the DC output terminal to the battery 26 on the vehicle and to the DC load such as a DC motor or a lamp. The voltage regulator 18 operates to maintain the voltage at the DC output terminal 19 at a predetermined value by turning on and off the exciting current which is supplied to the field winding 3.

As the above-described charging generator outputs only a DC output such as a DC 12 V or 24 V output, it is disadvantageous in the following points:

(1) The generator can not supply an AC power to an AC load such as an AC defroster for the front or rear window of a vehicle, an AC high voltage lamp or an induction motor which may be installed on a vehicle in future.

(2) When it is required to obtain from a vehicle a power source for electrical equipment such as an electrical pot, an electrical oven or an electrical cooking device which needs AC 100 V, a special voltage converter must be provided.

(3) If it is intended to use the system voltage of the vehicle instead of the voltage converter described in paragraph (2) above, then the electrical equipment described in paragraph (2) must be so modified that it agrees with the system voltage of the vehicle.

DISCLOSURE OF THE INVENTION

A general object of this invention is to improve a charging generator. A particular object of the invention is to provide a charging generator which can supply DC power to a battery on a vehicle and to a plurality of electrical devices and can supply AC power.

These objects have been achieved by the provision of a charging generator which, according to the invention, comprises: a first rotor fixedly mounted on a rotary shaft, the first rotor having a first field winding which is excited through a pair of slip rings and a pair of brushes; an inductor type rotor fixedly mounted on the rotary shaft in such a manner that the inductor type rotor is adjacent to the first rotor, the inductor type rotor having no bracket and slip ring; a first stator arranged on the outer wall of the first rotor with a small gap therebetween, the first stator having a first winding; a rectifier device connected to the first winding of the first stator; a DC output terminal connected to the rectifier device; a second field winding arranged on the inner wall of the inductor type rotor with a small gap therebetween, the second field winding being secured to a bracket; a second stator arranged on the outer wall of the inductor type rotor, the second stator having a second winding; and an AC output terminal connected to the second winding of the second stator, the number of turns of the second winding being larger than that of the first winding.

Being designed as described above, the charging generator of the invention has the following effects:

(1) Similarly as in a conventional charging generator, the charging generator of the invention can supply DC power to batteries, DC motors, lamps, etc. Furthermore, the charging generator can supply high voltage AC power to AC window defrosters, high voltage lamps, etc. which may be installed on vehicles in future.

(2) When a single-phase receptacle is installed at a suitable position on a vehicle or the like and the speed of the charging generator is set to a suitable value, then 100 V AC can be maintained across the lines connected to the single-phase receptacle. Therefore, the charging generator can supply AC power to electrical devices of 100 V AC such as an electrical pot, an electrical oven, an electrical cooking device, and an electrical soldering iron.

(3) As the inductor type rotor is provided on the AC output side, the provision of slip rings and brushes is unnecessary, and the axial dimension can be made smaller than that of a system in which two ordinary rotors are juxtaposed in the axial direction.

(4) If a bracket is so formed that the charging generator can be installed in the same way as a conventional charging generator on the engine of a vehicle or the like, then the conventional charging generator can be readily replaced by the charging generator of the invention, and therefore it is unnecessary to modify the engine.

BRIEF DESCRIPTION OF THE DRAWINGS

FIG. 2 is an electrical wiring diagram showing the conventional charging generator installed on a vehicle or the like.

FIG. 4 is an electrical wiring diagram showing the charging generator according to the invention which is installed on a vehicle or the like.

BEST MODE FOR CARRYING OUT THE INVENTION

One embodiment of this invention will be described with reference to FIGS. 3 and 4.

Figure 1:
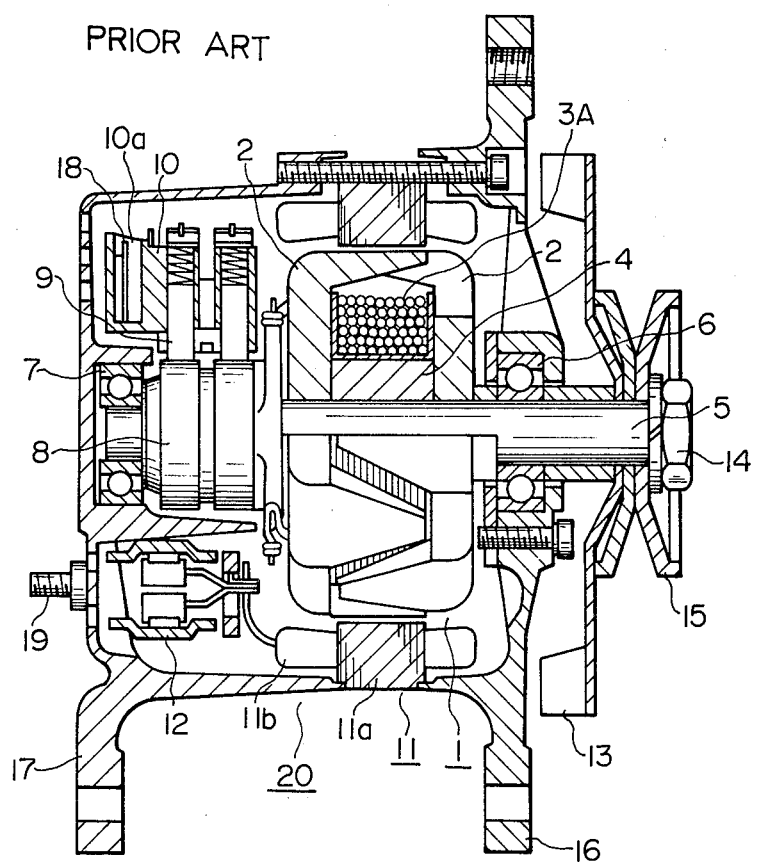
FIG. 1 is a sectional view showing the arrangement of a conventional charging generator.
Figure 2:
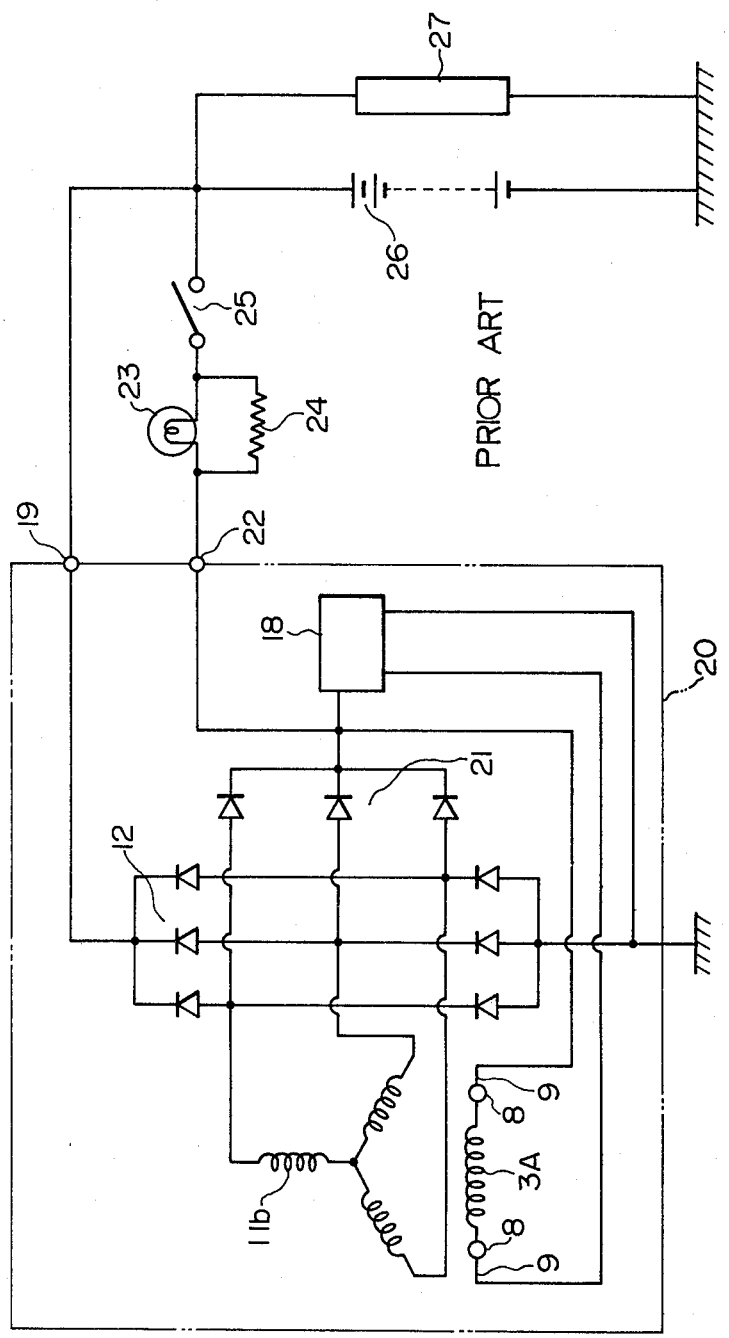
Figure 3:
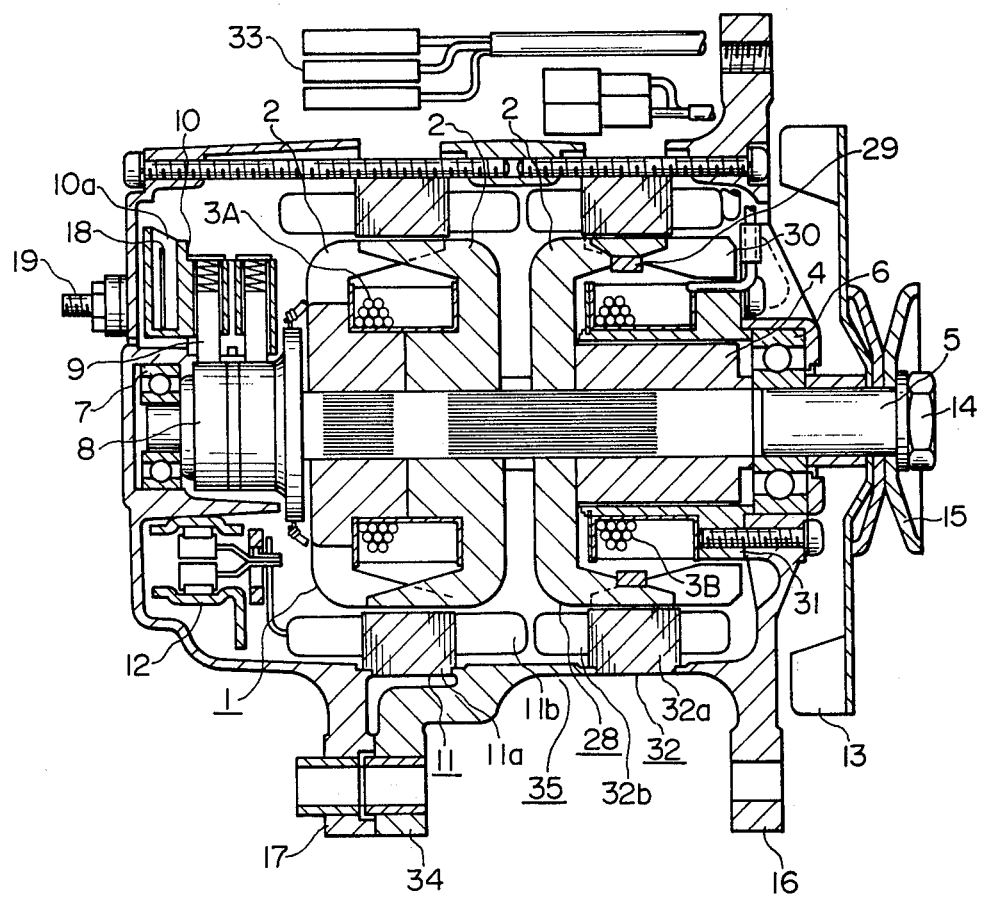
FIG. 3 is a sectional view showing a charging generator which is one embodiment of this invention.

FIG. 3 is a sectional view of a charging generator according to the invention. In FIG. 3, reference numeral 28 designates an inductor type rotor which is fixedly mounted on a rotary shaft 5 in such a manner that the inductor type rotor 28 and a rotor 1 are juxtaposed. The inductor type rotor 28 comprises confronted magnetic poles 2, a magnetic insulating ring 29, confronted magnetic pole rings 30 and a field core 4. A field winding frame 31 hold a second field winding 3B. The field winding frame 31 is provided on the inner wall of the inductor type rotor 28 with a small gap therebetween. A second stator 32 is provided on the outer wall of the inductor type rotor 28 with a small gap therebetween. The second stator 32 is made up of a second armature core 32a and a second armature winding 32b which is wound on the core 32a in three-phase and star connection. A three-phase AC output terminal 33 is connected to the second armature winding 32b; an intermediate bracket 34 is provided between the first and second stators 11 and 32; and charging generator 35 is made up of the above-described components. The number of turns of the second armature winding 32b is much larger than that of the first armature winding 11b, to sufficiently raise the voltage.

Figure 4:
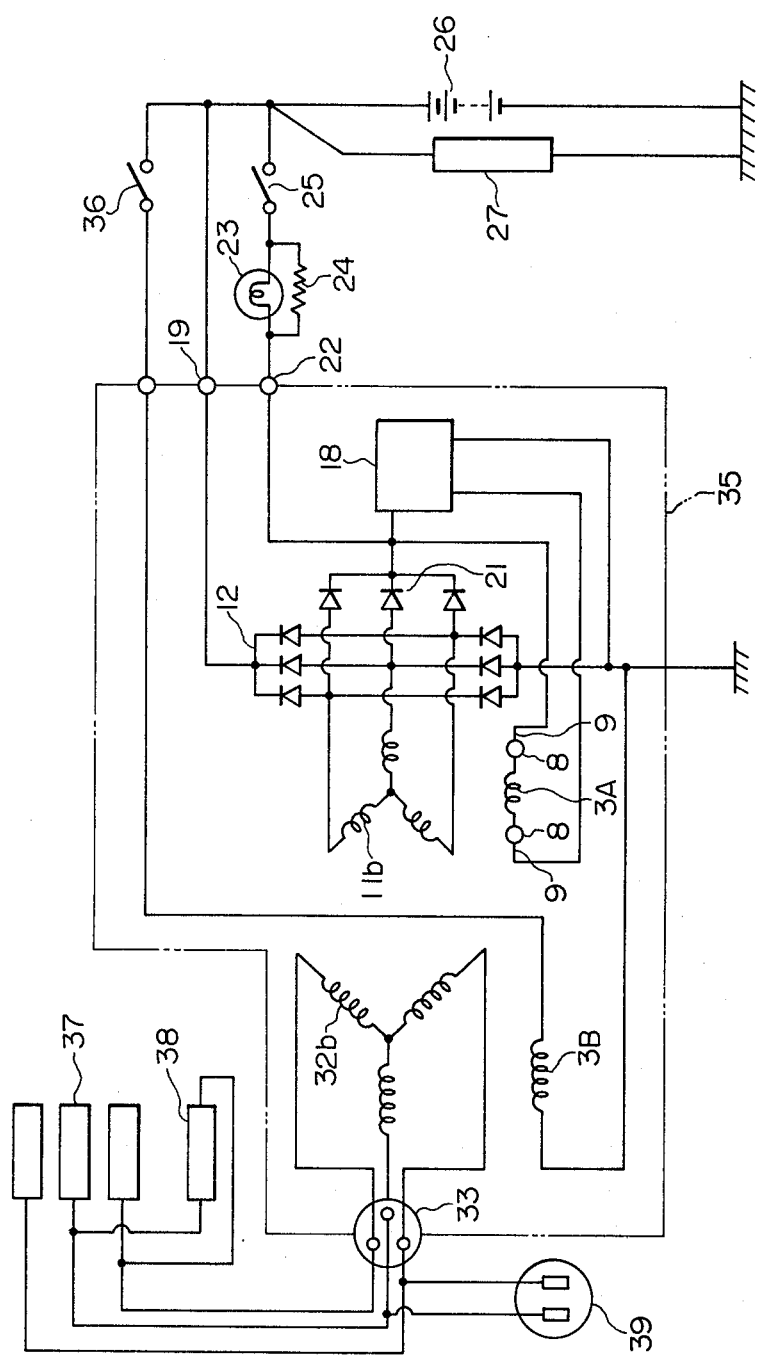

When the above-described charging generator is installed on a vehicle or the like, the electrical wiring is as shown in FIG. 4. In FIG. 4, reference numeral 36 designates a normally opened contact means; 37, a three-phase AC load such as a three-phase AC window defroster; 38, a single-phase AC load such as a high voltage lamp; and 39, a single-phase AC receptacle provided at a suitable position on a vehicle or the like.

The operation of the charging generator thus arranged will be described.

When the key switch 25 is closed, the battery 26 supplies an exciting current through the charging indication lamp 23 and the initial exciting resistor 24 and through the initial exciting terminal 22, the brushes 9 and the slip rings 8 to the first field winding 3A. In this operation, the charging indication lamp is turned on, thus indicating the non-charging state, i.e., the fact that the exciting current is supplied to the field winding 3A from the battery 26. On the other hand, when the engine of the vehicle (not shown) is started, the rotary shaft 5 turns. As a result, a rotating magnetic field is developed, and a predetermined AC output is developed in the first armature winding 11b. The AC output is applied to the DC output terminal 19 after being subjected to full-wave rectification in the rectifier device 12.

When the speed of the engine is increased until the voltage at the initial exciting terminal 22 becomes equal to the voltage of the battery 26, the current to the charging indication lamp 23 and the initial exciting resistor 24 is interrupted; that is, the charging indication lamp 23 is turned off, thus indicating the fact that the charging generator 35 has been excited. Thereafter, the exciting current to the first field winding 3A is supplied through the auxiliary rectifier device 21 from the first armature winding 11b. A DC power is supplied through the DC output terminal 19 to the battery 26 and the DC load 27. The voltage regulator 18 operates to maintain the voltage of the DC output terminal 19 at a predetermined value by intermittently controlling the exciting current which is supplied to the first field winding 3A.

When the normally opened contact means 36 is closed, an exciting current is supplied through the normally opened contact means 36 to the second field winding 3B. In this operation, the rotary shaft 5 is maintained rotated as described above, and therefore the inductor type rotor 28 develops a rotating magnetic field and a predetermined AC output is developed in the second armature winding 32b. The AC output is applied through the three-phase AC output terminal 33 to the three-phase AC load or the single-phase AC load 38. The voltage across the lines connected to the single-phase AC receptacle can be set to 100 V AC by suitably controlling the speed of rotation of the rotary shaft 5. Therefore, the AC power can be supplied to electrical equipment of 100 V AC such as an electrical pot, oven, cooking device or soldering iron.

As is apparent from the above description, in the embodiment of the invention, the inductor type rotor, and the field winding and the second stator are so arranged that the small gaps are provided between the field winding and the inner wall of the rotor and between the second stator and the outer wall of the rotor, respectively, and they are juxtaposed with the components of the conventional DC power supplying generator. Therefore, the compact charging generator can supply AC power.

In the above-described embodiment, the voltage regulator 18 is built in the charging generator 35; however the same effects can be obtained even in the case where the voltage regulator 18 is provided separately. In the above-described embodiment, both of the first and second armature windings 11b and 32b are of three-phase and star connection; however, the number of phases and the connection type may be selected as desired. Furthermore in the above-described embodiment, the number of poles is not described for the rotor 1 and the inductor type rotor 28, which means that the number of poles may be selected as desired for them.

INDUSTRIAL APPLICABILITY

This invention is considerably effective in application to a vehicle or the like.

I claim:

1. A generator comprising: a cylindrically shaped frame; a rotary shaft adapted to be rotated by a vehicular motor; a first rotor fixedly mounted on said rotary shaft, said first rotor comprising a plurality of circumferentially arranged pole members of alternating magnetic polarity; a first field winding wound on said first rotor; a pair of slip rings and a pair of brushes for making connection to said first field winding; a second rotor fixedly mounted on said rotor forwardly of said first rotor, said second rotor being an induction-type rotor comprising a cylindrically shaped field core fitted flush against said rotary shaft, a cup-shaped magnetic pole member with said field core being positioned within said magnetic pole member, at least one magnetic pole ring, and a magnetic insulating ring coupling said at least one magnetic pole ring to said magnetic insulating ring; a field winding frame fixedly mounted on said frame and extending into a gap between said field core and said magnetic pole member; a second field winding wound on said field winding frame; a first stator core fixedly mounted on an inside wall of said frame and surrounding said first rotor with a small gap therebetween; a first stator winding wound on said first stator; rectifying means for rectifying an output voltage produced across said first stator winding; a second stator core fixedly mounted on said inside wall of said frame and surrounding said second rotor with a small gap therebetween; a second stator winding wound on said second stator core; and AC output terminals coupled to corresponding ends of said second stator winding, a number of turns of said second stator winding being substantially greater than a number of turns of said first stator winding.

* * * * *